(No Model.)
O. S. EBERT.
NUT LOCK.
No. 571,066.  Patented Nov. 10, 1896.
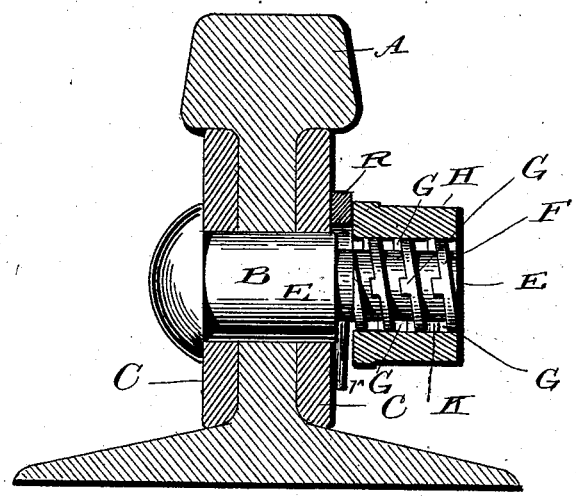
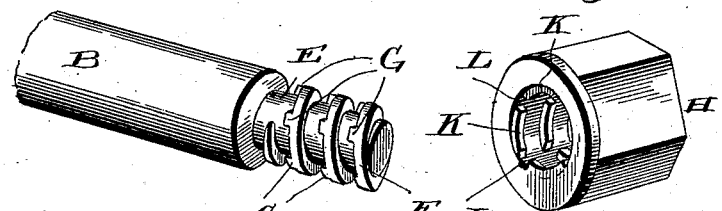
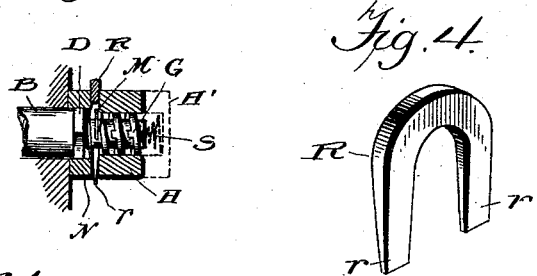
Witnesses:
L. C. Hills.
A. L. Hough
Inventor:
Octavius S. Ebert,
by Franklin H. Hough
Atty.

UNITED STATES PATENT OFFICE.

OCTAVIUS SUTTON EBERT, OF GALESBURG, ILLINOIS.

NUT-LOCK.

SPECIFICATION forming part of Letters Patent No. 571,066, dated November 10, 1896.

Application filed January 24, 1896. Serial No. 576,704. (No model.)

*To all whom it may concern:*

Be it known that I, OCTAVIUS SUTTON EBERT, a citizen of the United States, residing at Galesburg, in the county of Knox and State of Illinois, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in locking devices, and especially to a nut-lock in which the nut is securely locked to the bolt and can be unlocked therefrom without the use of a wrench, the unlocking being effected by a peculiar construction of a threaded bolt which is provided with lugs or offsets against which the sections of the broken threads about the inner circumference of a nut are designed to abut to lock the nut in place, and to be forced out of the path of the lugs or offsets when it is desired to remove the nut, the said nut being held in its locked position by any convenient means.

A further purpose of my invention consists in the construction of a locking device in connection with any kind of bolts, cylinders, &c., in which offsets are provided on the threads of the bolt or cylinder, &c., which are designed to register with recesses in the broken threads of a nut to prevent any possible unlocking of the nut, a sufficient space being left between the inner end of the nut and a washer or fish-plate, in which space a wedge or U-shaped member may be inserted.

When it is desired to unlock the nut, the washer or U-shaped member may be removed, which will allow of sufficient play of the nut whereby the same may be removed by releasing the lugs or offsets from the broken threads of the nut.

In splicework on railway construction it is my purpose to hold the nut in a locked relation by the simple means of a wedge-shaped member placed between the nut and the fish-plate. I also interpose a spring between a washer and the inner end of the nut, or, when capped nuts are used, I insert a spring between the inner end wall of the bore of the nut and the end of the bolt, whereby in either case the nut may be, under the tension of the spring or springs, held in its locked position.

To these ends and to such others as the invention may pertain, the same consists, further, in the novel construction, combination, and adaptation of the parts as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts throughout the several views, in which—

Figure 1 is a cross-sectional view of a railway-rail, showing a bolt inserted therethrough and provided with my improved locking device. Fig. 2 is an enlarged detail in perspective of the bolt. Fig. 3 is an enlarged detail view in perspective of the nut. Fig. 4 is an enlarged detail view of the U-shaped washer which is to be interposed between the nut and a fish-plate. Fig. 5 is a view showing a spring for holding the nut in a locked position and a capped nut shown in dotted lines.

Reference now being had to the details of the drawings by letter, A represents a railway-rail in section, which is perforated to receive the bolt B, and C C are fish-plates. The contracted end of the bolt is threaded, as seen at F, which threads have, preferably integral therewith, lugs or offsets G.

The nut H is provided with internal broken threads K, having between the broken sections of the threads recesses L, which are disposed in alinement and in series about the inner circumference of the wall of the bore of the nut, each recess being of a width equal to the width of the lugs or offsets on the bolt.

The nut H is screwed on the threads of the bolt in the ordinary way until the nut comes in contact with the fish-plate or other member desired to be engaged by the nut, and when the broken-thread sections are opposite the space between the lugs on the threads of the bolt the nut is slightly drawn outward the width of the lug on the thread, and the nut is securely prevented from screwing in either direction until the nut is forced inward a sufficient distance to free the broken threads from the said lugs.

To lock the nut in its locked relation when used in connection with railway construction, a U-shaped member or wedge R is driven in parallel with the rail between the inner end of the nut and the fish-plate, or a washer N, which surrounds the bolt and bearing against the fish-plate. When it is desired to remove the nut, the ends of the washer may be straightened and then easily removed, after which the nut may be quickly unlocked and unscrewed.

When it is desired to use a bolt equipped with my improved locking means for the nut on other constructions, I employ a spring M, which is interposed between the end of the nut and the object against which the nut is to be locked, the office of spring being to force the broken-threaded portions of the internally-threaded nut between the lugs on the threads of the bolt to lock the nut between the lugs on the threads. When it is desired to use a nut with a cap, a spring S is interposed between the outer end of a bolt and the inner end wall of the bore of the nut, which serves the same purpose as the spring M. When it is desired to unlock the nut from its contact with the lugs on the threads of the bolt, the nut is forced in under the tension of the spring and released from the lugs and allowed to be readily unscrewed.

Some of the features herein shown and described are not claimed herein, as they form the subject-matter of another application filed by me January 24, 1896, Serial No. 576,705.

Having thus described my invention, what I claim to be new, and desire to secure by Letters Patent, is—

1. The combination with a bolt, cylinder or other member having a threaded portion with lugs out of the plane of its threads, of a head cap-nut having broken threads, a spring interposed between the outer end of the bolt and the inner wall of the end of the nut, and a locking device interposed between the inner end of the nut and the fish-plate, substantially as shown and described.

2. The combination with a bolt, cylinder or other member having a threaded portion with lugs out of the plane of its threads, combined with a nut having broken threads, means for yieldingly forcing the nut in the direction of the length of the bolt, and a U-shaped wedge for permanently locking the nut, substantially as described.

3. In a nut-lock, the combination with a bolt passed through a railway-rail and a fish-plate and threaded a portion of its length, a series of lugs in rows on the same side of the thread of the bolt, and a nut provided with a series of broken threads designed to work on the threads of the bolt and to be locked thereto in the manner described, of a U-shaped washer designed to be interposed between the nut and the fish-plate, substantially as shown and described.

In testimony whereof I affix my signature in presence of two witnesses.

OCTAVIUS SUTTON EBERT.

Witnesses:
DANIEL E. ALLEN,
J. P. TRISSOL.